(12) United States Patent
Hu et al.

(10) Patent No.: US 8,781,167 B2
(45) Date of Patent: Jul. 15, 2014

(54) APPARATUS AND METHOD FOR DETERMINING A LOCATION IN A TARGET IMAGE

(75) Inventors: Mingxing Hu, London (GB); Baptiste Allain, London (GB); David Hawkes, London (GB); Sebastien Ourselin, London (GB); Laurence Lovat, London (GB); Richard Cook, London (GB)

(73) Assignee: UCL Business PLC, London (GB)

( * ) Notice: Subject to any disclaimer, the term of this patent is extended or adjusted under 35 U.S.C. 154(b) by 320 days.

(21) Appl. No.: 13/393,325

(22) PCT Filed: Sep. 1, 2010

(86) PCT No.: PCT/GB2010/001651
§ 371 (c)(1),
(2), (4) Date: May 11, 2012

(87) PCT Pub. No.: WO2011/027107
PCT Pub. Date: Mar. 10, 2011

(65) Prior Publication Data
US 2012/0219185 A1 Aug. 30, 2012

(30) Foreign Application Priority Data
Sep. 1, 2009 (GB) .................................. 0915200.0

(51) Int. Cl.
G06K 9/00 (2006.01)
A61B 1/00 (2006.01)
A61B 1/04 (2006.01)

(52) U.S. Cl.
USPC ............ 382/103; 600/101; 600/117; 600/145

(58) Field of Classification Search
CPC ..................................... G06K 9/00; G06T 1/00
USPC .................. 382/103; 348/169, 170, 171, 172; 378/62, 98.8, 143, 167; 600/101, 104, 600/117, 118, 145, 407, 372; 128/920, 922
See application file for complete search history.

(56) References Cited

U.S. PATENT DOCUMENTS 5,704,897 A * 1/1998 Truppe .......................... 600/117
6,226,543 B1 * 5/2001 Gilboa et al. ................. 600/407

FOREIGN PATENT DOCUMENTS

WO  9703601  2/1997

OTHER PUBLICATIONS

Hartley, R., "Multiple View Geometry in Computer Vision", 2008, Cambridge University Press, XP002619333, pp. 379-383.

*Primary Examiner* — Abolfazl Tabatabai
(74) *Attorney, Agent, or Firm* — Park, Vaughan, Fleming & Dowler LLP

(57) ABSTRACT

An apparatus and a computer-implemented method are provided for determining a location in a target image (T) of a site on a surface of a physical object using two or more reference images ($I_1$, $I_2$) of said physical object that have been obtained with a reference imaging device. Each of said two or more reference images includes said site on the surface of the physical object and was obtained with the reference imaging device having a different position and/or orientation relative to said physical object. The target image is obtained by a target imaging device and includes the site on the surface of the physical object. For each reference image, a set of feature mappings from the reference image to the target image is used to determine the epipolar geometry between the reference image and the target image, and a projection of the site from the reference image onto the target image is calculated from said epipolar geometry. The location in the target image of the site on the surface of the physical object is determined from the calculated epipolar projections for the two or more reference images.

20 Claims, 4 Drawing Sheets

APPARATUS AND METHOD FOR DETERMINING A LOCATION IN A TARGET IMAGE

FIELD OF THE INVENTION

The present invention relates to an apparatus and method for determining a location in a target image of a site on a surface of a physical object.

BACKGROUND OF THE INVENTION

Endoscopy is a minimally invasive procedure for the real-time acquisition of video images of the interior surfaces of an organ with a flexible or rigid endoscope. Endoscopy is often used to allow a biopsy to be taken. Significant problems for many endoscopies are biopsy site detection, path planning to reach the site, and re-localisation (re-identification) of the site during the same or a future examination. For example, many endoscopic procedures (such as oesophageal endoscopy for Barrett's Oesophagus) require the endoscopist to return to a location previously identified to take a measurement or extract a small sample of tissue (biopsy) for analysis of cellular structure and/or to detect the presence of pathology, in particular cancer and pre-cancerous conditions. Re-localisation may be required during the procedure as the endoscope may move, the patient may cough etc, or it may be required at a later date in order to assess disease progression.

One particular method is known as optical biopsy. This method is based on the properties of light to make a diagnosis in vivo and in situ during endoscopy, while the diagnosis is traditionally done by histological or cytological analysis. It has been shown that optical biopsies contribute to a better detection of malignancy which is invisible during endoscopy and improve the accuracy of the diagnosis. However, it is difficult in practice to have a good match between a tissue sample extracted for histology and the extent scanned during optical biopsy. As a result, many extracted samples may present irrelevant information, which brings great difficulties to the clinicians to diagnose, screen, stage and treat diseases.

In bronchoscopy, for example, an attempt has been made to solve these problems with a guidance system based on tracking the bronchoscope during the examination in relation to a pre-operative CT image (see Helferty J. P. et al., "Computer-based system for the virtual-endoscopic guidance of bronchoscopy", October-November 2007, *Computer Vision and Image Understanding*, Vol. 108, Issues 1-2, pp. 171-187; and Mori K. et al., "Bronchoscope tracking without fiducial markers using ultra-tiny electromagnetic tracking system and its evaluation in different environments", October 2007, Medical Image Computing and Computer-Assisted Intervention (MICCAI'07), Vol. 4792 of *Lecture Notes in Computer Science*, pp. 664-651, Springer-Verlag). Such systems have helped to localise biopsy sites with a precision of 1.58 mm (Helferty J. P. et al.). Nevertheless, some examinations like gastroscopy are based only on video images. Therefore, the endoscopist may want to use miniprobes that are inserted into the working channel of the endoscope and that return additional microscopic information (in vivo histology) or any other signal from the tissue in order to detect and localise biopsy sites. When the endoscopist detects a suspicious region, it is scanned with the miniprobe in contact with the tissue surface in order to confirm the diagnosis. If a tissue sample needs to be extracted from this region, the miniprobe is replaced with forceps.

A significant problem for applications in endoscopy procedures based on video images only and for gastroscopy in particular is that biopsies are performed by interactive guidance of the forceps by the endoscopist. Therefore, once a biopsy site has been detected with a miniprobe, for example, at the tissue surface, it needs to be re-localised precisely in the next video images in order to go back to the same position with the forceps. The problem of object localisation in video images has recently been addressed in applications for minimally invasive surgery (see Speidel S. et al., "Tracking of Instruments in Minimally Invasive Surgery for Surgical Skill Analysis", MIAR 2006, Vol. 4091 of *Lecture Notes in Computer Science*, pp. 148-155, Springer-Verlag; and Voros S. et al. "Automatic Localization of Laparoscopic Instruments for the Visual Servoing of an Endoscopic Camera Holder", 2006, Medical Image Computing and Computer-Assisted Intervention (MICCAI'06), Vol. 4190 of *Lecture Notes in Computer Science*, pp. 535-542, Springer-Verlag). However, these documents focus only on tracking the instrument tip and its trajectory for robotized-assisted surgeries.

The above problems are also relevant to other medical applications where a point site needs to be re-localised, for example for accurate therapy delivery. In addition, similar problems also apply to non-medical applications such as industrial inspection; remote sensing in hostile environments or very remote sites, for example, underground or underwater, or in space exploration; remote manipulation and repair; and telerobotics.

SUMMARY OF THE INVENTION

One embodiment of the invention provides a computer-implemented method for determining a location in a target image (T) of a site on a surface of a physical object. The method includes providing two or more reference images ($I_1$, $I_2$) of said physical object that have been obtained with a reference imaging device. Each of the two or more reference images includes said site on the surface of the physical object and was obtained with the reference imaging device having a different position and/or orientation relative to said physical object (compared with its position for the other reference images). The method further includes receiving a target image obtained by a target imaging device (which may be the same device as the reference imaging device or a different device). The target image includes the site on the surface of the physical object.

For each reference image, the method then includes using a set of feature mappings from the reference image to the target image to determine the epipolar geometry between the reference image and the target image, and calculating from said epipolar geometry a projection of the site from the reference image onto the target image. The location in the target image of the site on the surface of the physical object can then be determined ("re-localized") from the calculated epipolar projections for the two or more reference images.

This approach has been found to provide an accurate and computationally efficient for locating the site on the surface of the physical object in the target image. The method has primarily been developed for use in endoscopy, where the reference images and the target image can be taken from different endoscope positions. However, the method can potentially be applied to a wide range of other situations, including medical investigations, engineering inspections, remote sensing, etc.

In one embodiment, the method further comprises identifying a location, $p_{T1}$, of the site in a first reference image, $I_1$ and a location, $p_{T2}$, of the site in a second reference image, $I_2$.

The epipolar geometry between the reference image $I_1$ and the target image T is described algebraically using the fundamental matrix $F_{1T}$:

$$F_{1T} = \begin{pmatrix} f_1 & f_2 & f_3 \\ f_4 & f_5 & f_6 \\ f_7 & f_8 & f_9 \end{pmatrix} = K^{-T}[t_{1T}]_x R_{1T} K^{-1} = K^{-T} \begin{bmatrix} 0 & -t_3 & t_2 \\ t_3 & 0 & -t_1 \\ -t_2 & t_1 & 0 \end{bmatrix} R_{1T} K^{-1}$$

where K is the imaging device intrinsic matrix defined with the focal length, the centre position of an image, and the scaling from 3D-space to the image. The epipolar geometry between the reference image $I_2$ and the target image T is described algebraically using the fundamental matrix $F_{2T}$:

$$F_{2T} = \begin{pmatrix} f_1 & f_2 & f_3 \\ f_4 & f_5 & f_6 \\ f_7 & f_8 & f_9 \end{pmatrix} = K^{-T}[t_{2T}]_x R_{2T} K^{-1} = K^{-T} \begin{bmatrix} 0 & -t_3 & t_2 \\ t_3 & 0 & -t_1 \\ -t_2 & t_1 & 0 \end{bmatrix} R_{2T} K^{-1}$$

where K is the imaging device intrinsic matrix defined with the focal length, the centre position of an image, and the scaling from the 3D-space to the image.

The epipolar projection for a reference image $I_1$ is calculated by computing the epipole $e^{1T}$, wherein $e^{1T}$ is the intersection of the axes formed with the camera centre for reference image $I_1$ and the camera centre for the target image with the image plane T. The epipolar projection for a reference image $I_2$ is calculated by computing the epipole $e^{2T}$, wherein $e^{2T}$ is the intersection of the axes formed with the camera centre for reference image $I_2$ and the camera centre for the target image with the image plane T. $F_{1T}p_{T1}$ defines an epipolar line $el_1$, which passes through the projection of $p_{T1}$ onto T and through $e^{1T}$, and $F_{2T}p_{T2}$ defines an epipolar line $el_2$, which passes through the projection of $p_{T2}$ onto T and through $e^{2T}$. The intersection of $el_1$ and $el_2$ corresponds to the location of the site in the target image T.

In one embodiment, calculating the epipolar projection for a reference image comprises choosing multiple different subsets of the feature mappings, determining the epipolar projection for each subset, computing the error associated with the determined epipolar projection across the whole set of feature mappings, and selecting the determined epipolar projection that provides the lowest computed error. Note that the total number of feature mappings may be large (a hundred or more), while each subset might only contain several feature mappings for computational efficiency. Such an approach may further comprise refining the determined epipolar projection using all of the set of feature mappings for the reference image.

In one embodiment, for each reference image the epipolar projection produces an epipolar line representing the projection in the target image of the location of the site in the reference image. If there are two reference images, the determined location for the site in the target image corresponds to the intersection of the two epipolar lines produced for the two reference images. If there are three or more reference images, the determined location for the site in the target image can be based on minimising a measure of distance from the three or more epipolar lines produced for the three reference images.

In one embodiment, the uncertainty of the determined location of the site is estimated by propagating uncertainties from the determination of the epipolar geometry for each reference image. Note that if three or more reference images are used, the scatter of intersections between the three or more epipolar lines will also give an indication of the uncertainty of the determined location.

One potential cause of error in the re-localization is any deformation between the various images. Nevertheless, the approach described herein has been found to be generally robust enough to accommodate a certain amount of deformation (which is to be expected in any endoscopic investigation).

In one embodiment, the method further comprises determining said set of feature mappings for each reference image in relation to the target image. Although in principle the feature mappings might be determined by hand (such as by a clinician marking corresponding points on two images), this is generally too slow for use in a real-time clinical environment. Accordingly, the feature mapping is generally performed automatically as a precursor to the re-localization.

In one embodiment, the method further comprises selecting an image to use as said target image. Thus the target imaging device may acquire multiple images, some (or potentially all) of which do not include the desired site on the physical object. One way of selecting a target image is to use information about the 3-dimensional position of the target imaging device relative to said physical object when each image is acquired. An image can then be selected as the target image if it can be determined from the 3-dimensional position that the target imaging device was viewing the desired site when the image was acquired.

In an endoscopic procedure, the information about the 3-dimensional position of the target imaging device relative to said physical object may be obtained using an electromagnetic tracking device. Such 3-dimensional position information is generally accurate enough to select an appropriate target image, but not to locate the desired site within the target image with sufficient accuracy for clinical purposes.

As discussed above, the reference and target images may be acquired during one or more endoscopic procedures. For example, the reference images may have been acquired during a first endoscopic investigation, while the target image is acquired during a second endoscopic investigation. Alternatively, the target image may be acquired during a later phase of the same endoscopic investigation used to acquire the reference images. In either case, the approach described herein generally allows the location of the site in the target image to be determined in real-time as the target image is received from an endoscope.

A further possibility is that the target image was acquired in an investigation prior to the investigation used to acquire the first and second reference images. This might be of interest to study the history and growth of an item (such as a cancerous growth in a medical investigation, or a crack or other structural defect in an engineering investigation) that is detected in the reference images, but was not previously noticed (and may not yet have existed) in the target image.

Various embodiments of the invention provide an apparatus and a computer program for implementing the above method. The computer program comprises program instructions that when executed by a computer system cause the computer system to perform the method. The computer program may be stored in a computer readable storage medium, such as an optical disk. The apparatus may comprise a general processor for implementing such a program, or may comprise (in whole or in part) special-purpose hardware for implementing the method.

The approach described herein provides re-localisation using robust feature tracking and the constraints of epipolar geometry. Visual feedback of the relocalisation can be provided in real-time on a display of the target image. This can include an indication of a confidence region (e.g. 95%) around the re-localised site, which may be represented, for example, as an ellipse shown around the site of interest—such as a re-localised biopsy site. This then provides the endoscopist with a region of confidence for where the true position of the biopsy site is.

The approach described herein can be used in any re-localisation application in both medical and non-medical fields. For example, in the medical field, the method can be used in endoscopic procedures and particularly in gastroenterology, such as in oesophageal or colonic endoscopy. The method can also be used for accurate therapy delivery. In non-medical fields, the method can be used, for example, in such applications as industrial inspection; remote sensing in hostile environments or very remote sites; remote manipulation and repair; and telerobotics.

One embodiment of the present invention provides a method for re-localising a site comprising: determining an approximate initial 3-dimensional position of the site; and determining a refined location of the site by geometric constraint using the epipolar geometry properties between the site in a series of at least three perspective projection images. The method may further comprise determining the 95% confidence region around the re-localised site for visual feedback. The method may be applied to optical images, X-ray images, or any other form of image. The step of determining an initial 3-dimensional position of the site may be carried out using an electromagnetic device. Alternatively, a number of other technologies may be used, such as mechanical, ultrasonic or sonic positioning, optical localising, interventional MR, or manual positioning, in order to provide an approximate position.

The approach described herein is based on the computation in the target image of a point's location as the intersection of two epipolar lines derived from the location of corresponding sites two or more previously acquired images. The epipolar geometry is recovered with a robust technique. Such an approach has several advantages. It provides a robust and reliable solution to track sites in any procedure. An initialization process can be used to give a starting point based on a tracking device, and a refinement process can then be used to obtain an accurate re-localisation position based on the geometric constraints between multiple images. The method also reduces the number of computations for the re-localization, since it only involves consideration of epipolar lines, without requiring the determination of spatial transformations between the images. Therefore, the method can track/re-localise a site with no or minimal interaction. In contrast, for many existing endoscopic re-localisation methods, the physicians need to make a visual inspection to identify the positions and sometimes have to utilise markers to assist the procedure. Furthermore, the method should work efficiently in real-time, such as for use in a real-time guidance system, based on a information coming from the endoscopic images and the electromagnetic tracking device. If no pre-operative images are used, no camera tracking and/or registration is involved, but rather, sites may be tracked directly in the endoscopic video images.

One embodiment of present invention provides a method and system for re-localisation of sites. The system for biopsy site re-localisation is based on computer vision technology and a 3-dimensional tracking device. It includes: (1) 3D positioning for initialization: called the initialization process. In an endoscopy application, the sensors may be attached to the tip of an endoscope (POSITION 1) and the patient's body (POSITION 2). The relative position of POSITION 1 and 2 provides an initial location of the site and is invariable to the patient's movement. (2) Geometric constraint to reach an accurate and reliable result: called the refinement process. The refinement process makes use of the epipolar geometry properties between at least three images of the same site observed from different points of view with a camera. The refinement process includes computing two epipolar lines between the two first images and the third image (target image) in which the site needs to be re-localised. The intersection of these lines corresponds to the position of the site.

Note that the use of epipolar geometry is already known in a medical context, see for example Hu M. et al., "3D reconstruction of internal organ surfaces for minimal invasive surgery", 2007, Medical Image Computing and Computer Assisted Intervention (MICCAI'07), Vol. 4791 of *Lecture Notes in Computer Science*, pp. 68-77, Springer-Verlag, but for different applications (not for re-localization). The present approach focuses on biopsy site re-localisation (and other analogous problems), which is concerned with spatial transformations (rotations and translations) between successive endoscopic images. As described herein, these spatial transformations can be efficiently accommodated with the recovery of the epipolar geometry formed by different endoscopic images.

BRIEF DESCRIPTION OF THE DRAWINGS

By way of example, an embodiment of the present invention will now be described with reference to the accompanying drawings, in which.

DETAILED DESCRIPTION

Figure 1:
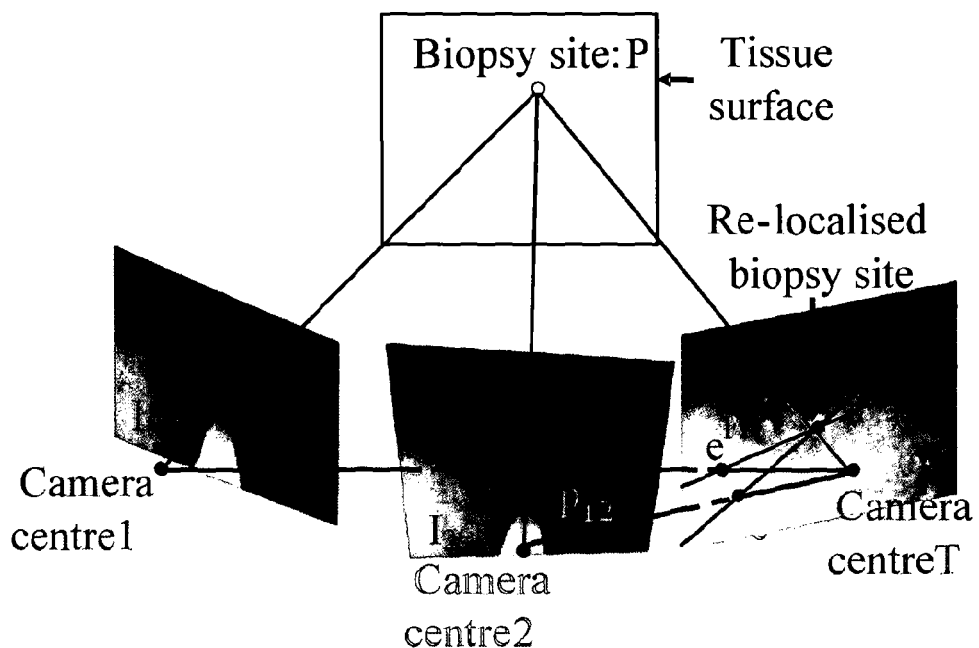
FIG. 1 illustrates a method for re-localisation using epipolar projection according to one embodiment of the present invention.

The following is a detailed description of an embodiment of the present invention as utilised in endoscopy. In particular, it is assumed that a site of interest has been acquired in two or more reference images, and the site now has to be identified (re-localized) in a target image. Note that the reference images and the target image may be acquired during the same clinical investigation (and therefore generally by the same imaging device associated with the endoscope). Alternatively, the reference images may have been acquired in a first clinical investigation and the target image is now acquired in a second clinical investigation at some later date. In this latter case, the imaging device used to acquire the target image may be the same as or different from the imaging device used to acquire the reference images. As described in more detail below, a positional sensor may be fitted at the tip of the endoscope in order to help re-localise biopsy sites when the endoscope camera moves widely.

Re-Localisation Framework

The re-localisation method is integrated into a framework comprising (a) initialization using 3D positioning information from an EM device, and (b) refinement based on geometric constraint.

a) Initialization Process

An electromagnetic (EM) position tracking device is used in association with the endoscope to acquire an initial, approximate location of the biopsy site. The tracking device can be any EM tracking equipment suitable for a medical application, e.g., an Aurora system (Northern Digital Inc; Waterloo, Ontario, Canada), a medSAFE system (Ascension Technology Corp, Burlington, Vt., U.S.A.), or a ScopeGuide system (Olympus Corp, Tokyo, Japan).

During the clinical investigation, one EM sensor is attached to the tip of the endoscope so that the 3D position of the endoscope can be tracked roughly from the EM device (POSITION 1). One or more additional EM sensors are attached to the patient's body in order to provide the 3D position of the patient in the same EM device coordinate system (POSITION 2). The relative position of POSITION 1 and 2 can be used to determine an approximate position of the endoscope relative to the biopsy site (with a typical accuracy of approximately 10 mm) and is invariate to the patient's movement b) Refinement Process The refinement process involves the computation of the epipolar lines which pass through the projection of the biopsy site in two reference images onto the target image.

If a biopsy site location is known in a first endoscopic image $I_1$ (referred to as a reference image), it can be projected onto another endoscopic image T (referred to as a target image) for its re-localisation in T. This projection can be determined with the epipolar geometry formed with the two endoscopic images $I_1$ and T. The epipolar geometry between $I_1$ and T can be described algebraically using the fundamental matrix $F_{1T}$ as:

$$F_{1T} = \begin{pmatrix} f_1 & f_2 & f_3 \\ f_4 & f_5 & f_6 \\ f_7 & f_8 & f_9 \end{pmatrix} = K^{-T}[t_{1T}]_x R_{1T} K^{-1} = K^{-T} \begin{bmatrix} 0 & -t_3 & t_2 \\ t_3 & 0 & -t_1 \\ -t_2 & t_1 & 0 \end{bmatrix} R_{1T} K^{-1} \quad (1)$$

K is the camera intrinsic matrix defined with the focal length, the centre position of an image, and the scaling from the 3D-space to the camera image. Once $F_{1T}$ and K are known, it is possible to determine the camera motion: the rotation $R_{1T}$ and the translation $t_{1T}$, with further computations.

During endoscopic procedures, a biopsy site can be seen from various points of view with the endoscopic camera. The different viewpoints reflect different positioning of the endoscope along (and within) the relevant organ, as well as any twisting of the head of the endoscope around its central axis. As illustrated in FIG. 1, let $I_1$ and $I_2$ be two (reference) images where the biopsy site location is visible and T be a third (target) image for which the biopsy needs to be re-localised. Let P be the biopsy site location in the 3D space, and $p_{T1}$ and $p_{T2}$ be respectively the locations of the biopsy site in images $I_1$ and $I_2$. The fundamental matrices $F_{1T}$ and $F_{2T}$ are computed between respectively images $I_1$ and T and images $I_2$ and T. The axes formed respectively with camera centre 1 and camera centre T, and camera centre 2 and camera centre T, have an intersection with the image plane T, which is called the epipole. Let $e^{1T}$ and $e^{2T}$ be the two epipoles of this configuration. $F_{1T}p_{T1}$ is a vector and defines the epipolar line $el_1$, which passes through the projection of $p_{T1}$ onto T and through $e^{1T}$. The epipolar line $el_2$ can be defined similarly from $F_{2T}p_{T2}$. As $p_{T1}$ and $p_{T2}$ correspond to the same biopsy site location in the 3D-space, the intersection of $el_1$ and $el_2$ represents the location of the biopsy site in image T. This re-localisation method has the advantage of requiring only the computation of the fundamental matrices $F_{1T}$ and $F_{2T}$.

Figure 2:
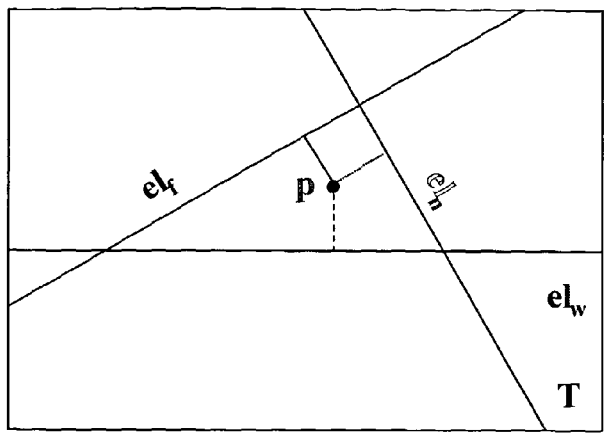
FIG. 2 illustrates how the method of FIG. 1 is extended to a re-localisation with a set of N reference images (where N>2).

This re-localisation method can also be extended to a configuration of N images, returning a series of epipolar lines with (in theory) a common intersection. In practice, for a configuration of N images, the epipolar lines tend not to have a unique intersection. In these circumstances, the re-localised biopsy site p can be computed by minimisation of its perpendicular distance to the N epipolar lines, as illustrated in FIG. 2, according to the following formula:

$$\min_p \sum_{i=1}^{N} \left( \frac{el_{ix} \cdot x + el_{iy} \cdot y + el_{im}}{\sqrt{el_{ix}^2 + el_{iy}^2}} \right)^2 \quad (2)$$

where $el_{ix}$, $el_{iy}$, $el_{im}$ are the three coefficients that define the epipolar line $el_i$ with i=[1 ... N] and x, y are the coordinates of the re-localised biopsy site p in the target image T.

Figure 3:
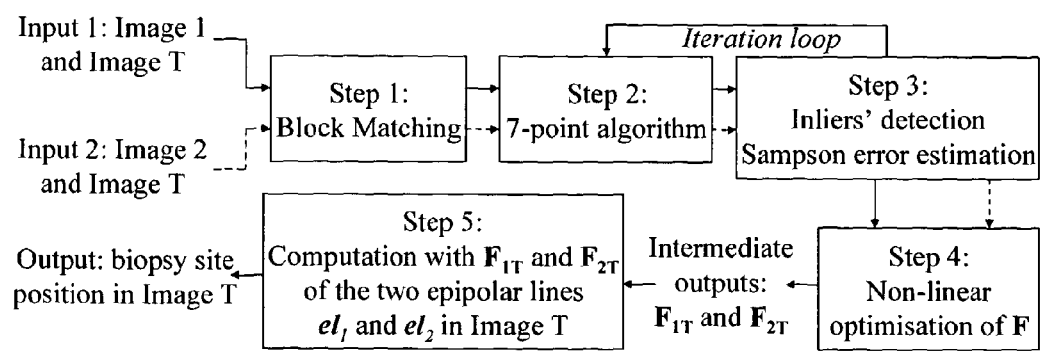
FIG. 3 depicts a block diagram of the site re-localisation method according to one embodiment of the invention.

The main steps of the refinement procedure follow the computations described by R. Hartley et al. in "Multiple View Geometry in Computer Vision", 2004, Cambridge University Press, to recover the epipolar geometry. This procedure is illustrated in FIG. 3, which depicts the processing where there are two reference images (1 and 2). This processing comprises two sequences: one sequence starts at Image 1 and finishes at Image T. The other sequence starts at Image 2 and finishes at Image T. The two sequences are processed independently in steps 1, 2, 3, and 4. If there are N reference images (N>2) additional sequences are used which start at Image i and finish at Image T.

The main computations for each input shown in FIG. 3 will now be described in more detail.

Feature Tracking

Feature tracking is used to identify a correspondence between features (such as edges or intersections) in a reference image and matching features in the target image. For the endoscopic applications described herein, the number of matching features between a pair of images may be large (more than a hundred).

In one embodiment, a block matching technique is used in step 1 of FIG. 3 to track reliably blocks of M×N pixels through a series of different endoscopic images. This technique is described by K. Mori et al. in "Tracking of a bronchoscope using epipolar geometry analysis and intensity based image registration of real and virtual endoscopic images", Medical Image Analysis, 2002, Vol. 6, pp. 321-336, for an application in bronchoscopy. The similarity between two blocks in two different images is measured as the cross-correlation of the pixel intensities in each block. Alternatively, a feature tracking method based on optical flow can also be used, such as described by B. Lucas et al. in "An iterative image registration technique with an application to stereo vision," in Proc. IJCAI, pp. 674-679, 1981. A further possibility is to perform the feature matching by hand, i.e. by a visual comparison of the reference and target images.

Detection of Inliers

The Maximum A Posteriori SAmple Consensus (MAP-SAC) method provides a robust method for detecting inliers (see Torr P. H. S. et al., "IMPSAC: A synthesis of importance sampling and random sample consensus", in IEEE Trans Pattern Analysis and Machine Intelligence, 25(3), pages 354-365, 2003). The approach involves minimising the error in the correspondence between points, which is equivalent to minimising a cost function C:

$$C = \sum_{i=1\ldots n} \rho(e_i^2) \text{ with } \rho(e_i^2) = \begin{cases} e_i^2 & \text{if } e_i^2 < T \\ T & \text{if } e_i^2 \geq T \end{cases} \quad (3)$$

T is a threshold set for the detection of inliers and $e_i$ is the geometric distance for a correspondence $\{p_{1i}, p_i\}$. This technique has the advantage of taking into account the contribution of the inliers to the error and to the fundamental matrix computation.

Determination of the Epipolar Lines Intersection

Steps 2 and 3 from FIG. 3 are iteratively run over samples of 7 correspondences S=$\{p_{1i}, p_i\}$. For each sample, the seven-point algorithm is applied (R. Hartley et al.) and returns one or three solutions for the fundamental matrix F. Then the MAPSAC's cost function is applied with the Sampson distance $e_i$:

$$e_i^2 = \frac{(p_i^T F p_{1i})^2}{(F p_{1i})_1^2 + (F p_{1i})_2^2 + (F^T p_i)_1^2 + (F^T p_i)_2^2}$$

(4) where $(Fp_{1i})_1$ is the 1st component of the vector $Fp_{1i}$. This error expresses how well F fits the correspondences $\{p_{1i}, p_i\}$. At the end of the iteration loop, F minimizes the cost C. A second estimation of F, minimising the Sampson distance, is found in step 4 of FIG. 3, using a constrained non-linear optimisation applied to the inliers detected from the MAPSAC. Then, in step 5 of FIG. 3, the epipolar lines passing through the projection of the biopsy site onto the third image are determined and their intersection returns the biopsy site. If N epipolar lines are used, the biopsy site is re-localised so it minimises its perpendicular distances to the epipolar lines (as per equation 2).

Feedback Process

Figure 4:
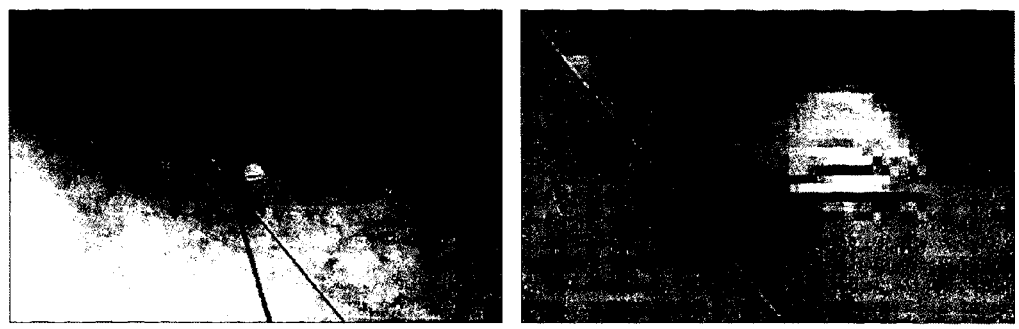
FIG. 4 shows an example of a re-localisation with 2 epipolar lines and includes a 95% confidence region around the re-localised biopsy site. The right-hand image is a zoomed version of the left-hand image.

A 95% confidence region can be determined around the re-localised biopsy site. This is illustrated in FIG. 4, which shows two (diagonal) projected epipolar lines, and an oval representing a confidence region around their intersection. (N.B. the right-hand image in FIG. 4 is an enlargement of the left-hand image).

The confidence region (for 95% or any other desired level of confidence) is determined from the covariance matrix of the re-localised biopsy site p:

$$\Lambda_p = E[(p - E[p])(p - E[p])^T] = \begin{bmatrix} \text{var}_{px} & \text{cov}_{pxpy} \\ \text{cov}_{pxpy} & \text{var}_{py} \end{bmatrix} \quad (5)$$

This covariance matrix describes the uncertainty of the re-localised biopsy site and can be computed by propagation of the uncertainty of the location of the inliers in the images firstly to the fundamental matrix, secondly to the epipolar lines, and finally to the re-localised biopsy site (see Zhang Z., "Determining the Epipolar Geometry and its Uncertainty: A Review", in International Journal of Computer Vision, 27(2), pages 161-195, 1998).

Validation

The approach described herein has been validated by first checking the recovery of the epipolar geometry and secondly assessing the re-localisation error. The validation was performed directly with in vivo data. These data were acquired with monocular endoscopes during a gastroscopy with three patients. The image dimensions were on average approximately 300×300 pixels. During the procedure, the endoscopist introduced a miniprobe into the working channel of the endoscope in order to detect a biopsy site, touched the oesophageal tissue, and removed it without widely moving the endoscope camera. The method has been validated with eleven groups of three endoscopic images.

As the re-localisation is based on the recovery of the epipolar geometry, the computed epipole positions were checked visually every time the method was applied to a group of three or more endoscopic images. The endoscope motions are usually small rotations and translations around and along the optical axis of the camera in consecutive images. Therefore, the epipole was expected to lie in an area reasonably coherent with the endoscope motions. The Sampson distance was computed for the fundamental matrix obtained firstly using a least squares regression over all the correspondences, and secondly with the method described herein, to check the contribution of the inliers' detection. This error was determined according to Equation (6):

$$e = \sqrt{\frac{1}{n} \sum_{i=1}^{n} \frac{(p_i^T F p_{1i})^2}{(F p_{1i})_1^2 + (F p_{1i})_2^2 + (F^T p_i)_1^2 + (F^T p_i)_2^2}} \quad (6)$$

The re-localisation method was then evaluated by the endoscopist. A point corresponding to a tissue region or to the tip of the miniprobe was manually selected in the first endoscopic images, tracked visually, and re-localised visually in the last image. This tracking process gave a ground-truth position, which could then be compared with the position obtained with the re-localisation method in order to estimate the error both in pixels and in millimeters. As the diameter of the miniprobe was 2 mm, the size of a salient segment, e.g. a vessel, in the same plane as the miniprobe could be computed. This salient segment defined a scale in the target Image T for the conversion of the error from pixels to millimeters and for an estimation of the tissue dimensions in the field of view (FOV) of the image.

The MAPSAC method was used for the detection of outliers in order to optimise the computation of the fundamental matrix. Four results out of eleven of epipole computation and error estimation are presented for two analysed regions of the first patient (Groups of images 1 and 2) and for one region of the second patient (Groups of images 3 and 4) in FIG. 5. The two epipoles from reference Image 1 and reference Image 2 respectively to target Image T are described with the '+' sign and the Miniprobe tip ('×' sign) is tracked from Image 1 and Image 2 to Image T. Two errors are computed for each group of images: one for the couple Image 1—Image T and one for Image 2—Image T. The outlier removal gave an order of magnitude reduction in the Sampson distance in comparison with the least squares regression, so there is a good performance of the error minimisation. The computed epipoles are located in an area coherent with the endoscope motions. In the group of images 1 and 4, the epipoles computed between Image 1 and Image T, and between Image 2 and Image T, are well separated since the endoscope camera movement has involved rotation and translation in all directions from Image 1 to Image 2. For the groups of images 2 and 3, where the endoscope camera has principally moved along its optical axis, the epipoles are less separated. In this situation, the epipoles may coincide and the epipolar lines passing through the projection of the tracked point in Image T may overlay one another. Accordingly, the most accurate results are generally obtained when camera motions between the endoscopic images are wide enough and are not pure translations along the optical axis.

Figure 5:
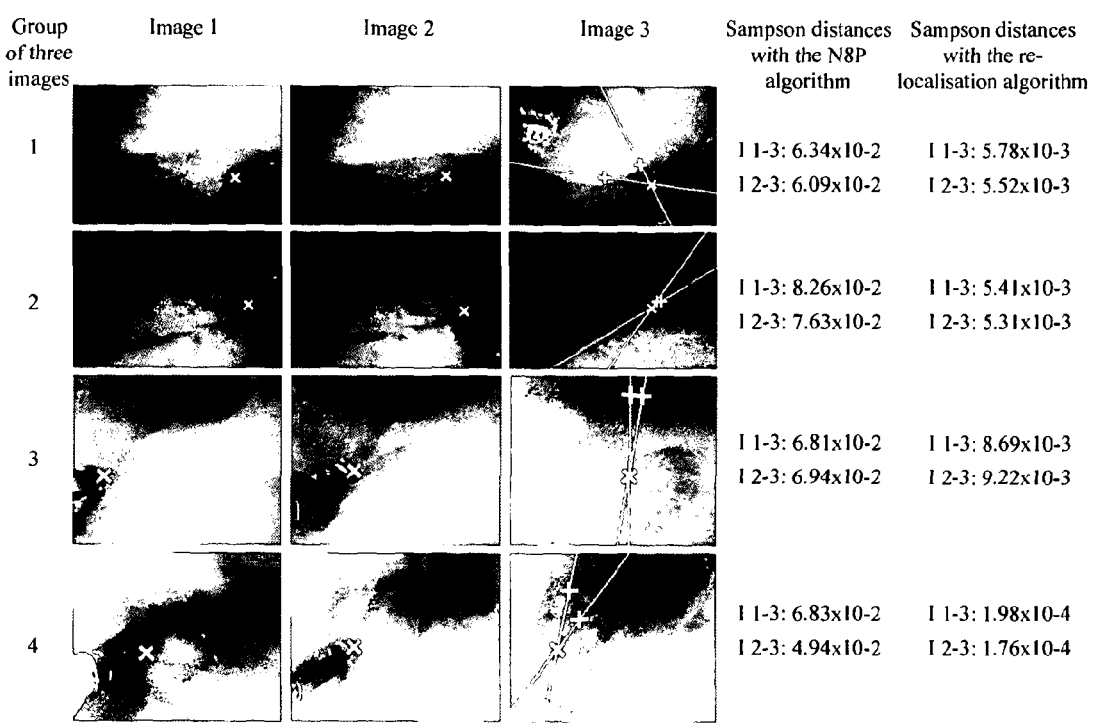
FIG. 5 shows results for four groups, each of two reference images and a target image, of the epipoles computation, of the re-localisation, and of the errors for the fundamental matrix estimation.

For the re-localisation validation, the miniprobe tip or a point of interest was manually set in Image 1 and Image 2 as indicated in FIG. 5. The estimated errors in pixels and in millimeters for the eleven groups of three or more endoscopic images are given in Table 1 below. This error varied from 2 pixels to 50 pixels in the x and y directions of the image. This location has to be related to the dimensions in millimeters in order to take into account the three dimensions of the original space. Thus, the endoscopist assessed the error at a maximum of 1.5 mm. In practice, an extracted tissue sample typically has an extent of 5 mm, which means that such an error is acceptable. Indeed, when coming back with forceps, the endoscopist would have a high chance of extracting a part of the region that had been analysed with the miniprobe.

Figure 6:
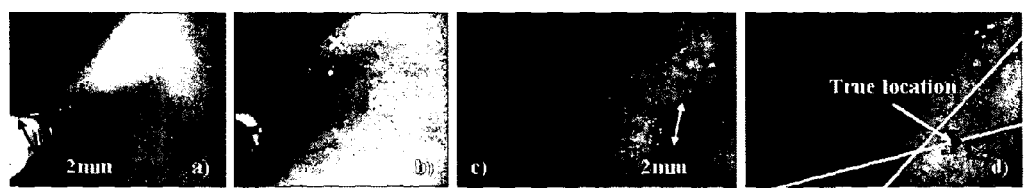
FIGS. 6(*a*) and 6(*b*) illustrate examples of incorrect re-localisation due to a smooth tissue texture, and FIGS. 6(*c*) and 6(*d*) illustrate the effect of outliers on the epipolar line computation.

The larger errors from 1.5 mm to 2 mm correspond mainly to endoscopic images with a poor contrast. For example, in FIG. 6(a), the tissue texture is smooth, so that the main feature points extracted with the block matching are located in the tissue ridges. These points returned less reliable correspondences than points located on vasculatures since the contrast varies in the ridges with the tissue motions. Thus the fundamental matrix was inaccurately estimated, which resulted in a point automatically re-localised at about 2 mm from the visually determined position (see FIG. 6(b)). Failures in the removal of outliers may also happen for data with good feature points, such as in the pair of images shown in FIGS. 6(c) and 6(d). One epipolar line computed from the miniprobe tip position in one image passed correctly through the true location of the tip, while another was around 1 mm from this location. Such a case resulted in an intersection of the epipolar lines at a distance of 1.5 mm from the true location.

TABLE 1

Re-localisation errors in pixels and estimation in millimeters.

| Image | Dimension (pixels) | FOV (mm) | Error (pixels) | Error (mm) |
|---|---|---|---|---|
| 1 | 229 × 344 | 20 × 15 | 1.3 × 7.6 | 0.60 |
| 2 | 229 × 344 | 30 × 30 | 12.8 × 24.7 | 1.39 |
| 3 | 229 × 344 | 30 × 30 | 1.9 × 0.5 | 0.52 |
| 4 | 229 × 344 | 30 × 30 | 14.9 × 26 | 0.59 |
| 5 | 229 × 344 | 15 × 10 | 47.9 × 12.4 | 1.28 |
| 6 | 193 × 235 | 15 × 20 | 29.2 × 3.4 | 1.40 |
| 7 | 193 × 235 | 30 × 30 | 12.9 × 3.6 | 1.22 |
| 8 | 193 × 235 | 30 × 30 | 2.2 × 32.5 | 2.56 |
| 9 | 193 × 235 | 20 × 30 | 8.3 × 31.2 | 2.13 |
| 10 | 216 × 339 | 30 × 30 | 1.9 × 0.05 | 0.3 |
| 11 | 216 × 339 | 30 × 30 | 2.1 × 0.6 | 0.2 |
| 12 | 216 × 339 | 20 × 20 | 1 × 1 | 0.13 |
| 13 | 280 × 376 | 20 × 70 | 2 × 2 | 0.16 |

Therefore, a system for the re-localisation of biopsy sites has been disclosed. The approach described herein represents an application of epipolar geometry properties involving a determination of the fundamental matrix. However, camera rotations and translations between the various image are not computed. The validation on clinical data described above shows that the re-localisation can be determined with an error less than 1 mm.

Although the particular embodiment described above relates to gastroscopic images, the method may potentially be applied to any other endoscopic procedure or similar technique. The approach described herein is also of potential application in a wide range of other investigations, for medical, engineering, and scientific purposes, such as remote sensing the integrity and condition of pipes and other structures.

It will be appreciated that the embodiment described is by way of example only, and that alterations or modifications may be made within the scope of the invention as defined in the following claims.

The invention claimed is:

1. A computer-implemented method for determining a location in a target image (T) of a site on a surface of a physical object, the method comprising:
providing two or more reference images ($I_1$, $I_2$) of said physical object that have been obtained with a reference imaging device, wherein each of said two or more reference images includes said site on the surface of the physical object and was obtained with the reference imaging device having a different position and/or orientation relative to said physical object;
receiving said target image obtained by a target imaging device, said target image including the site on the surface of the physical object;
for each reference image: using a set of feature mappings from the reference image to the target image to determine the epipolar geometry between the reference image and the target image, and calculating from said epipolar geometry a projection of the site from the reference image onto the target image; and
determining from the calculated epipolar projections for the two or more reference images the location in the target image of the site on the surface of the physical object.

2. The method of claim 1, further comprising:
identifying a location, $p_{T1}$, of the site in a first reference image, $I_1$; and
identifying a location, $p_{T2}$, of the site in a second reference image, $I_2$.

3. The method of claim 2 wherein the epipolar geometry between the reference image $I_1$ and the target image T is described algebraically using the fundamental matrix $F_{1T}$ as:

$$F_{1T} = \begin{pmatrix} f_1 & f_2 & f_3 \\ f_4 & f_5 & f_6 \\ f_7 & f_8 & f_9 \end{pmatrix} = K^{-T}[t_{1T}]_x R_{1T} K^{-1} = K^{-T} \begin{bmatrix} 0 & -t_2 & t_2 \\ t_3 & 0 & -t_1 \\ -t_2 & t_1 & 0 \end{bmatrix} R_{1T} K^{-1}$$

where K is the imaging device intrinsic matrix defined with the focal length, the centre position of an image, and the scaling from 3D-space to the image, and wherein the epipolar geometry between the reference image $I_2$ and the target image T is described algebraically using the fundamental matrix $F_{2T}$ as:

$$F_{2T} = \begin{pmatrix} f_1 & f_2 & f_3 \\ f_4 & f_5 & f_6 \\ f_7 & f_8 & f_9 \end{pmatrix} = K^{-T}[t_{2T}]_x R_{2T} K^{-1} = K^{-T} \begin{bmatrix} 0 & -t_3 & t_2 \\ t_3 & 0 & -t_1 \\ -t_2 & t_1 & 0 \end{bmatrix} R_{2T} K^{-1}$$

where K is the imaging device intrinsic matrix defined with the focal length, the centre position of an image, and the scaling from the 3D-space to the image.

4. The method of claim 2, wherein the epipolar projection for a reference image $I_1$ is calculated by computing the epipole $e^{1T}$, wherein $e^{1T}$ is the intersection of the axes formed with the camera centre for reference image $I_1$ and the camera centre for the target image with the image plane T, and wherein the epipolar projection for a reference image $I_2$ is calculated by computing the epipole $e^{1T}$, wherein $e^{2T}$ is the intersection of the axes formed with the camera centre for reference image $I_2$ and the camera centre for the target image with the image plane T.

5. The method of claim 4 wherein $F_{1T}p_{T1}$ defines an epipolar line $el_1$, which passes through the projection of $p_{T1}$ onto T and through $e^{1T}$, and wherein $F_{2T}p_{T2}$ defines an epipolar line $el_2$, which passes through the projection of $p_{T2}$ onto T and through $e^{2T}$.

6. The method of claim 5 wherein the intersection of $el_1$ and $el_2$ corresponds to the location of the site in the target image T.

7. The method of claim 1, wherein calculating the epipolar projection for a reference image comprises choosing multiple different subsets of the feature mappings, determining the epipolar projection for each subset, computing the error associated with the determined epipolar projection across the whole set of feature mappings, and selecting the determined epipolar projection that provides the lowest computed error.

8. The method of claim 7, wherein calculating the epipolar projection further comprises refining the determined epipolar projection using all of the set of feature
   mappings for the reference image.

9. The method of claim 1, wherein for each reference image the epipolar projection produces an epipolar line representing the projection in the target image of the location of the site in the reference image.

10. The method of claim 9, wherein there are two reference images, and the determined location for the site in the target image corresponds to the intersection of the two epipolar lines produced for the two reference images.

11. The method of claim 9, wherein there are three or more reference images, and the determined location for the site in the target image is based on minimising a measure of distance from the three or more epipolar lines produced for the three reference images.

12. The method of claim 1, wherein the uncertainty of the determined location of the site is estimated by propagating uncertainties from the determination of the epipolar geometry for each reference image.

13. The method of claim 1, further comprising determining said set of feature mappings for each reference image.

14. The method of claim 1, further comprising selecting an image to use as said target image using information about the 3-dimensional position of the target imaging device relative to said physical object.

15. The method of claim 14, wherein said information about the 3-dimensional position of the target imaging device relative to said physical object is obtained using an
   electromagnetic tracking device.

16. The method of claim 1, wherein said reference imaging device and said target imaging device are the same device.

17. The method of claim 1, wherein said reference and target images are acquired during one or more endoscopic procedures.

18. The method of claim 17, wherein the location in a target image of the site is determined in real-time during an endoscopic procedure as the target image is received from an endoscope.

19. A computer readable storage medium containing a computer program comprising program instructions that when executed by a computer system cause the computer system to perform a method for determining a location in a target image (T) of a site on a surface of a physical object, the method comprising:
   providing two or more reference images ($I_1$, $I_2$) of said physical object that have been obtained with a reference imaging device, wherein each of said two or more reference images includes said site on the surface of the physical object and was obtained with the reference imaging device having a different position and/or orientation relative to said physical object;
   receiving said target image obtained by a target imaging device, said target image including the site on the surface of the physical object;
   for each reference image: using a set of feature mappings from the reference image to the target image to determine the epipolar geometry between the reference image and the target image, and calculating from said epipolar geometry a projection of the site from the reference image onto the target image; and
   determining from the calculated epipolar projections for the two or more reference images the location in the target image of the site on the surface of the physical object.

20. Apparatus for determining a location in a target image (T) of a site on a surface of a physical object, the apparatus comprising:
   storage means for holding two or more reference images ($I_1$, $I_2$) of said physical object that have been obtained with a reference imaging device, wherein each of said two or more reference images includes said site on the surface of the physical object and was obtained with the reference imaging device having a different position and/or orientation relative to said physical object, and for holding said target image obtained by a target imaging device, said target image including the site on the surface of the physical object;
   and one or more processors for computing:
   for each reference image, the epipolar geometry between the reference image and the target image using a set of feature mappings from the reference image to the target image, and calculating from said epipolar geometry a projection of the site from the reference image onto the target image; and
   the location in the target image of the site on the surface of the physical object using the calculated epipolar projections for the two or more reference images.

* * * * *